Patented July 27, 1937

2,088,360

UNITED STATES PATENT OFFICE 2,088,360

MAKING ALCOHOLIC LIQUORS

Frank M. Ashley, Brooklyn, N. Y.

No Drawing. Application June 19, 1934,
Serial No. 731,263

6 Claims. (Cl. 99—46)

My invention relates to alcoholic beverages.

The object of my invention is to provide a new process comprising steps by the use of which whisky, brandy, or rum may be provided which will retain more of the flavor and aroma characteristic of the specific ingredients such as rye, apples, etc., from which said whisky or fruit brandy, etc., is obtained.

A further object of my invention is to process a freshly made beer comprising ethyl and higher alcohols, and also distilled liquor such as whisky, brandy or rum, to quickly ripen the same and provide a pure and potable beverage.

Heretofore it has been the common practice to make whisky, brandy, and rum by distilling the fermented liquor, usually referred to as beer, to separate the higher alcohols and impurities from the ethyl alcohol.

Due to the miscibility of the higher alcohols with the water content of the beer, a portion of them including amyl alcohol is carried with the water vapor into the condenser of the distilling apparatus, thus making it necessary to further distill fractionally to remove such alcohols from the ethyl alcohol.

One of the basic steps of my process for making whisky, brandy or rum, is to freeze the water content of the fermented liquid to form ice, then separate the ice from the liquor and filter the liquor while very cold to remove the solids together with the fats and oils congealed due to the low temperature.

Thereafter the liquor may be, and in some cases is led into a still in which the ethyl alcohol is separated from the higher alcohols and aldehydes, as will be readily understood.

In distilling the liquor, no water is present in the still except such small quantity as may have been carried with the liquor by reason of incomplete separation, and the higher alcohols are more easily separated from the ethyl alcohol; also the cost of the distilling step, due to the absence of water, is greatly reduced.

In treating large quantities of the freshly fermented beer or liquid provided by ferments, I may filter or centrifuge the same to remove the greater part of the solids therein prior to freezing the water content, and may then also filter after the freezing step to remove the fats and oils before distilling the residue.

The methods employed for removing the last fraction of water from ethyl alcohol to provide cologne spirit is well known and may be employed to further purify the alcohol if found necessary.

My process may be used for maturing freshly distilled brandy, whisky or rum, etc., and consists in freezing the distillate and removing the ice therefrom, then filtering thru charcoal or storing it in the presence of charcoal to further purify it, and thereafter adding pure water to provide a potable liquor.

By storing the liquid in its pure state without any water, or with a relatively small quantity of water present therein, it will mature in a very short time.

It will be obvious that in treating a previously distilled product from which the essential oils and esters which give to the beverage its strong flavor and odor have been removed by the distilling operation, a mildly flavored liquor only will be provided.

In making a rich whisky or brandy, etc., the essential oils and esters should be retained in the finished product.

The volatile essential oils are soluble only in strong alcohol, and are insoluble in its aqueous solutions. They distill also at a much higher temperature than alcohol and so are found only among the last products of distillation.

Therefore in treating the fermented undistilled liquid to provide a full flavored brandy, whisky or rum, I may first filter the liquid and then freeze the water content, or a predetermined part thereof to form ice which is separated from the residue then treat the residue to mature it, and thereafter add pure water to it to provide a beverage.

The treatment above referred to may be to filter thru charcoal, activated charcoal preferred, or to simply store in a keg in which charcoal is present to remove the aldehydes and mature the higher alcohols, etc.

In order to more quickly mature the residue I prefer to subject it to an oxidizing agent such as oxygen and hydrogen generated from a small portion of the water left in or added to the residue, and decomposing the water with an electric current applied near the bottom of the container so that the gases will permeate the fluid and escape at the surface thereof, and if required, the said gases may be pumped from above the residue and again used by forcing them into the lower side of the container and causing them to again flow upward therethru.

Instead of using oxygen and hydrogen generated in the liquid, I may take pure oxygen, ozone, warm air or $CO_2$ and pump it into the liquor and circulate it therein, repeating the operation with a small amount of the agent used until the desired condition of the liquid is reached.

Care must be taken to prevent overtreatment which results in generating acetic acid.

The treated liquid may now be stored if desired, or it may be distilled to separate the fusel oils remaining in the liquid if found to be required in order to provide a beverage for immediate consumption, and this can be accomplished at a relatively low temperature, which is desirable in order to reduce the cost, and to provide a better flavored liquor.

I am aware that the finest flavor and aroma possible to be obtained from a given fermented liquor is due to the esters such as the valeric and acetic esters and ethers, butyric acetate, amyl acetate, amyl valeriante and ethers or esters of other fatty acids present in the liquor before maturing, therefore in obtaining such a product I do not wish to remove such substances, but rather to retain and by properly maturing or blending them to provide a product rich in flavor and aroma.

Due to the aldehydes and higher alcohols, the taste and odor of the freshly made liquid immediately after the freezing process is harsh and disagreeable, even though greatly reduced in strength by the addition of water, but after it has been matured and then water added to make it potable, it has a fine rich flavor and odor characteristic of the fruit or grain used.

In order to provide a well flavored beverage quickly by my process it is not necessary that all of the water should be removed from the fermented liquid, but a part, about 10 to 15 per cent of the water should be left in the liquid, the remaining part being removed as ice, and the liquid then filtered at a temperature above that of the congealing point of the fats, thus retaining some of the oils and ester forming compounds that would otherwise be removed; after which I may further treat the residue to mature it, and thereafter add pure water to reduce it to a potable condition.

I have found that a suitable maturing step consists in circulating a mixture of ozone and nitrous oxide thru the liquid after it has been filtered, acts to quickly mellow and improve both the odor and taste of the beverage, and makes a product superior to that generally provided by the direct distilling methods heretofore employed.

Due to the strength of the alcohols when stored without water, or with a relatively small amount thereof, the coloring of the beverage is of a deeper shade due to the greater extraction of the gums and tannin in the kegs, thus dispensing with the use of caramel or other coloring matter usually employed to color the beverage when it cannot be stored for a considerable period of time.

In filtering the fermented liquid I prefer to use charcoal as the filtering material, and may use a filter constructed as described in the patent granted to Joseph Miller, October 13, 1903, No. 741,055.

If ozone is to be used it may be generated by means of the apparatus described in the patent to Joseph Miller and Frank M. Ashley, October 27, 1903, No. 742,341, or ozone and nitrous oxide by the constructions shown in patents to Frank M. Ashley December 7, 1909, No. 942,046, or No. 951,787, March 15, 1910.

Any other type of commercial filter may be used suitable for the purpose as well as other filtering materials such as diatomaceous earth to remove the solids, but charcoal acts to improve the odor of the liquor and probably to improve its quality as to flavor.

I am satisfied that the step of freezing the fermented liquid acts thereon in a manner to hasten its maturity.

The process of freezing the water content of the fermented liquid may be carried out in several ways.

The quicker the water is frozen the better the separation appears to be.

One way is to lead the beer or fermented liquid in a wide thin stream onto the lower outer side of a horizontally positioned drum, refrigerated by expanding gases flowing thru the drum, and as the drum is rotated, the ice formed thereon is carried over the top of the drum and scraped therefrom on the opposite side thereof by a scraper blade, a portion of the ice thus formed being added to the beer before the freezing step to cool it and thus reduce the cost of operation.

The alcohol content drips from the ice as it is formed and flows into a container below the drum and is led therefrom to other containers for further treatment.

Another way is to place the beer in cans as in the ice making industry, and freeze the water content into ice, then draw off the alcohol content for treatment, and sell the ice for refrigeration purposes.

A new way of freezing the fermented liquid and at the same time conditioning it for quick maturing, is to cause it to flow over $CO_2$ (carbon dioxide) in its congealed form, commonly called "Dry Ice" which acts to rapidly freeze the water content as it sublimates. Also I may use carbon dioxide gas by introducing it into the container below the surface of the liquid directly from its storage tank, and as it expands in the liquid the water is frozen and the fluid residue is withdrawn for further treatment.

I am aware that socalled applejack is made by allowing fermented apple juice to freeze in the barrel in which it was stored, in the winter time when the temperature was low enough to freeze a portion of the water content, but it is seldom that the temperature is sufficiently low to freeze all of the water content, and from a commercial standpoint it would be impractical. I do not know of any subsequent treatment that has been used by the farmers for maturing such applejack to provide a quickly potable beverage.

All of the genuine applejack, sold as such on the market and called applejack brandy, is distilled from the apple ferment and is not genuine applejack.

The real applejack brandy made by my present process is far superior in its taste and odor qualities to that provided by the present distilling process, and is in fact equal to the real applejack in these qualities while capable of being matured and potable in a relatively short period of time.

Having thus described my invention, I claim as new:

1. The process of making a beverage high in alcoholic content which includes the steps of causing beer derived from a fermented mash of high alcoholic content to flow in contact with carbon dioxide in congealed form to freeze a large proportion of the water content of the beer into ice, separating the resultant unfrozen liquid that is high in alcoholic content from said ice, filtering the unfrozen alcoholic liquid while at a sufficiently low temperature to congeal the fats and oils therein for the removal of the fats and oils with the solids from the liquid.

2. The process of making a beverage high in alcoholic content which includes the steps of subjecting a beer derived from a fermented mash of high alcoholic content to a temperature sufficient to freeze a large proportion of the water content thereof into ice, separating the resultant unfrozen liquid that is high in alcoholic content from said ice, filtering the unfrozen alcoholic liquid while at a sufficiently low temperature to congeal the fats and oils therein for the removal of the fats and oils with the solids from the liquid.

3. The process of making a beverage high in alcoholic content which includes the steps of subjecting a beer derived from a fermented mash of high alcoholic content to a temperature sufficient to freeze a large proportion of the water content thereof into ice, separating the resultant unfrozen liquid that is high in alcoholic content from said ice, filtering the unfrozen alcoholic liquid while at a sufficiently low temperature to congeal the fats and oils therein for the removal of the fats and oils with the solids from the liquid and then storing the liquid in containers in the presence of charcoal to quickly mature the liquid.

4. The process of making a beverage high in alcoholic content which includes the steps of subjecting a beer derived from a fermented mash of high alcoholic content to a temperature sufficient to freeze a large proportion of the water content thereof into ice, separating the resultant unfrozen liquid that is high in alcoholic content from said ice, then adding the ice to a fermented beer to be passed through the steps of the process for initially reducing the temperature thereof and conserving any alcoholic content present in the ice, filtering the unfrozen alcoholic liquid while at a sufficiently low temperature to congeal fats and oils therein for the removal of the fats and oils with the solids from the liquid and then storing the liquid in containers in the presence of charcoal to quickly mature the liquid.

5. The process of making a beverage high in alcoholic content which includes the steps of subjecting a beer derived from a fermented mash of high alcoholic content to a temperature sufficient to freeze a large proportion of the water content thereof into ice, separating the resultant unfrozen liquid that is high in alcoholic content from said ice, filtering the unfrozen alcoholic liquid while at a sufficiently low temperature to congeal the fats and oils therein for the removal of the fats and oils with the solids from the liquid, then subjecting the liquid to the action of an electric current to cause a portion of the water retained therein to decompose into a gaseous condition and act upon the liquid to mature the same.

6. The process of making a beverage high in alcoholic content which includes the steps of subjecting a beer derived from a fermented mash of high alcoholic content to a temperature sufficient to freeze a large proportion of the water content thereof into ice, separating the resultant unfrozen liquid that is high in alcoholic content from said ice, filtering the unfrozen alcoholic liquid while at a sufficiently low temperature to congeal the fats and oils therein for the removal of the fats and oils with the solids from the liquid and then distilling the liquid to effect the separation of higher alcohols and aldehydes.

FRANK M. ASHLEY.